United States Patent
Park et al.

(10) Patent No.: US 8,681,940 B2
(45) Date of Patent: Mar. 25, 2014

(54) APPARATUS AND METHOD FOR X-RAY DETECTING

(75) Inventors: Jin-Woo Park, Yongin (KR); Kwan-Wook Jung, Yongin (KR); Jea-Eun Ryu, Yongin (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 434 days.

(21) Appl. No.: 12/973,529

(22) Filed: Dec. 20, 2010

(65) Prior Publication Data

US 2011/0164723 A1 Jul. 7, 2011

(30) Foreign Application Priority Data

Jan. 5, 2010 (KR) ......................... 10-2010-0000542

(51) Int. Cl.
*H05G 1/64* (2006.01)
(52) U.S. Cl.
USPC ...................................... 378/98.12; 378/98.5
(58) Field of Classification Search
USPC ........................ 378/62, 98.12, 98.2, 98, 98.5
See application file for complete search history.

(56) References Cited

U.S. PATENT DOCUMENTS

| 6,469,740 | B1 | 10/2002 | Kuroda et al. | |
|---|---|---|---|---|
| 2006/0056588 | A1* | 3/2006 | Endo | 378/62 |
| 2006/0291624 | A1* | 12/2006 | Xue et al. | 378/98 |
| 2007/0206721 | A1 | 9/2007 | Tkaczyk et al. | |
| 2009/0147921 | A1* | 6/2009 | Okamura | 378/98.12 |
| 2010/0245378 | A1* | 9/2010 | Matsuura | 345/589 |

FOREIGN PATENT DOCUMENTS

| JP | 2001-309236 A | 11/2001 |
|---|---|---|
| JP | 2003000578 | 1/2003 |
| JP | 2009100848 A | 5/2009 |
| JP | 2009201586 A | 9/2009 |
| JP | 2009279201 | 12/2009 |
| KR | 1998-071065 A | 10/1998 |
| KR | 10-2002-0059540 | 7/2002 |
| KR | 10-2004-0010299 A | 1/2004 |

* cited by examiner

*Primary Examiner* — Hoon Song
(74) *Attorney, Agent, or Firm* — Robert E. Bushnell, Esq.

(57) ABSTRACT

An X-ray detecting apparatus constructed as the present invention receives an X-ray passing through a subject during a window time in which the subject is exposed to the X-ray, and converts the X-ray into an electrical signal to output the electrical signal as a video signal. The X-ray detecting apparatus subtracts the offset video signal determined according to the window time in the video signal to generate a real video signal representing the X-ray result for photographing the subject.

10 Claims, 6 Drawing Sheets

| PD | 1 | 2 | | |
|---|---|---|---|---|
| 1 → | 2000 | 2100 | ... | |
| 2 → | 2004 | 1900 | ... | |
| | ⋮ | ⋮ | | |
| | | | ⋰ | |

| PD | 1 | 2 | | |
|---|---|---|---|---|
| 1 → | 1000 | 1000 | ... | |
| 2 → | 1000 | 1000 | ... | |
| | ⋮ | ⋮ | | |
| | | | ⋰ | |

APPARATUS AND METHOD FOR X-RAY DETECTING

CLAIM OF PRIORITY

This application makes reference to, incorporates the same herein, and claims all benefits accruing 35 U.S.C §119 from an application earlier filed in the Korean intellectual Property Office on 5 Jan. 2010 and there duly assigned Serial No. 10-2010-0000542.

BACKGROUND OF THE INVENTION

1. Field of the Invention

The present invention relates to an X-ray detecting apparatus and an X-ray detecting method, and more particularly, to an X-ray detecting apparatus having an increased operation speed and an X-ray detecting method which improves an operation speed of the X-ray detecting apparatus.

2. Description of the Related Art

Recently, an X-ray transmittance photo apparatus widely used in the medical industry has been receiving a large amount of attention as a high value product and has been spotlighted in the research and industry fields. The operation speed is one of important parameters of the X-ray detecting apparatus. Hereafter, a period of one frame to obtain an X-ray image is referred to as an image processing period.

The above information disclosed in this Background section is only for enhancement of understanding of the background of the invention and therefore it may contain information that does not form the prior art that is already known in this country to a person of ordinary skill in the art.

SUMMARY OF THE INVENTION

It is therefore one aspect for the present invention to provide an improved X-ray detecting apparatus having an increased operation speed and an improved X-ray detecting method which increases an operation speed of the X-ray detecting apparatus by reducing an image processing period of the X-ray detecting apparatus.

An X-ray detecting apparatus for photographing a subject by using an X-ray constructed as the present invention includes a detector receiving the X-ray passing through the subject during a window time in which the subject is exposed to the X-ray, and converting the X-ray into an electrical signal to generate and output a video signal; and a central processing unit subtracting an offset video signal determined in accordance with the window time from the video signal in order to generate a real video signal representing an X-ray result of photographing the subject.

The central processing unit may determine the offset video signal by using a relationship between the window time and a squared value of the offset video signal corresponding to the window time. The relationship between the window time and a squared value of the offset video signal corresponding to the window time may be linear.

The central processing unit may include a lookup table storing the relationship between the window time and a squared value of the offset video signal corresponding to the window time, and an image processor generating the real video signal by subtracting the offset video signal from the video signal.

The detector may include an X-ray panel converting the X-ray passing through the subject into a visible ray, and generating an electrical current in accordance with an amount of the converted visible ray; and an automatic exposure control (AEC) unit receiving the generated electrical current input, determining whether the X-ray of an initial predetermined amount is input to the X-ray panel by using the input electrical current, and outputting an auto exposure control signal which stops the exposure of the X-ray for the subject when the X-ray of the initial predetermined amount is input.

The X-ray panel may include a scintillator converting the X-ray passing through the subject into the visible ray, and a PIN diode receiving the converted visible ray and generating a charge in proportion to the amount of the visible ray. A PIN diode is a diode with a wide, lightly doped intrinsic semiconductor region between a p-type semiconductor region and an n-type semiconductor region. The p-type and n-type regions are typically heavily doped because they are used for ohmic contacts. A PIN diode operates under a high-level injection. In other words, the intrinsic "i" region is flooded with charge carriers from the "p" and "n" regions. A PIN diode obeys the standard diode equation for low frequency signals.

The X-ray detecting apparatus may further include an X-ray generator generating the X-ray and stopping the generation of the X-ray in response to the auto exposure control signal.

A method for detecting an X-ray for photographing a subject by using the X-ray in accordance with the present invention includes inputting the X-ray passing through the subject during a window time in which the subject is exposed to the X-ray; converting the input X-ray into an electrical signal and outputting the electrical signal as a video signal; determining an offset video signal contained in the video signal in accordance with the window time; and subtracting the offset video signal from the video signal in order to generate a real video signal representing an X-ray result for photographing the subject.

The determination of the offset video signal may use the relationship between the window time and a squared value of the offset video signal corresponding to the window time.

The relationship between the window time and a squared value of the offset video signal corresponding to the window time may be linear.

In the conversion of the input X-ray into the electrical signal to output the electrical signal as the video signal, the X-ray passing through the subject may be converted into the visible ray, and the electrical current is generated according to the amount of the converted visible ray. The method may further include receiving the generated current, and determining whether the X-ray of an initial predetermined amount is input to the X-ray panel by using the input electrical current; and stopping the exposure of the X-ray for the subject when the X-ray of the initial predetermined amount is input as the determined result.

The present invention provides an X-ray detecting apparatus and an X-ray detecting method to reduce the processing period of the X-ray video signal, and to increase the operation speed of the X-ray detecting apparatus.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout this specification and the claims that follow, when it is described that an element is "coupled" to another element, the element may be "directly coupled" to the other element or "electrically coupled" to the other element through a third element. In addition, unless explicitly described to the contrary, the word "comprise" and variations such as "comprises" or "comprising" will be understood to imply the inclusion of stated elements but not the exclusion of any other elements.

Referring to an operation of the X-ray detecting apparatus, X-ray is firstly generated from an X-ray generator as an X-ray source. The X-ray generated is passed through a subject and is input into a detecting panel installed inside of the subject. The detecting panel detects the input X-ray and outputs a digital signal representing the X-ray detected. In succession, the digital signal is output through a compensation process in order to represent images photographed in a present photographing period.

The X-ray detecting apparatus acquires an offset image previously obtained in a state in which the X-ray is not irradiated and a preview mage obtained through the compensation of a bright image generated by irradiating the X-ray. The preview image is converted into an X-ray image by image processing of the X-ray detecting apparatus.

This contemporary method must secure a predetermined period to obtain the offset image. The X-ray window period during which the bright image is obtained is substantially less than 0.1 second. The window period is however fixed to about one (1) second when a margin for an irregular exposure of the X-ray is taken into consideration. Therefore, even though the exposure of the X-ray is finished, time loss is generated due to the fixed window time.

The time period for obtaining the offset image and the margin period by the irregular exposure of the X-ray increase time period during which the X-ray image is obtained.

The above information disclosed is only for enhancement of understanding of the background of the invention and therefore it may contain information that does not form the prior art that is already known in this country to a person of ordinary skill in the art. An exemplary embodiment of the present invention to be easily realized by a person skilled in the art will be described in detail with reference to the drawings.

Figure 1:
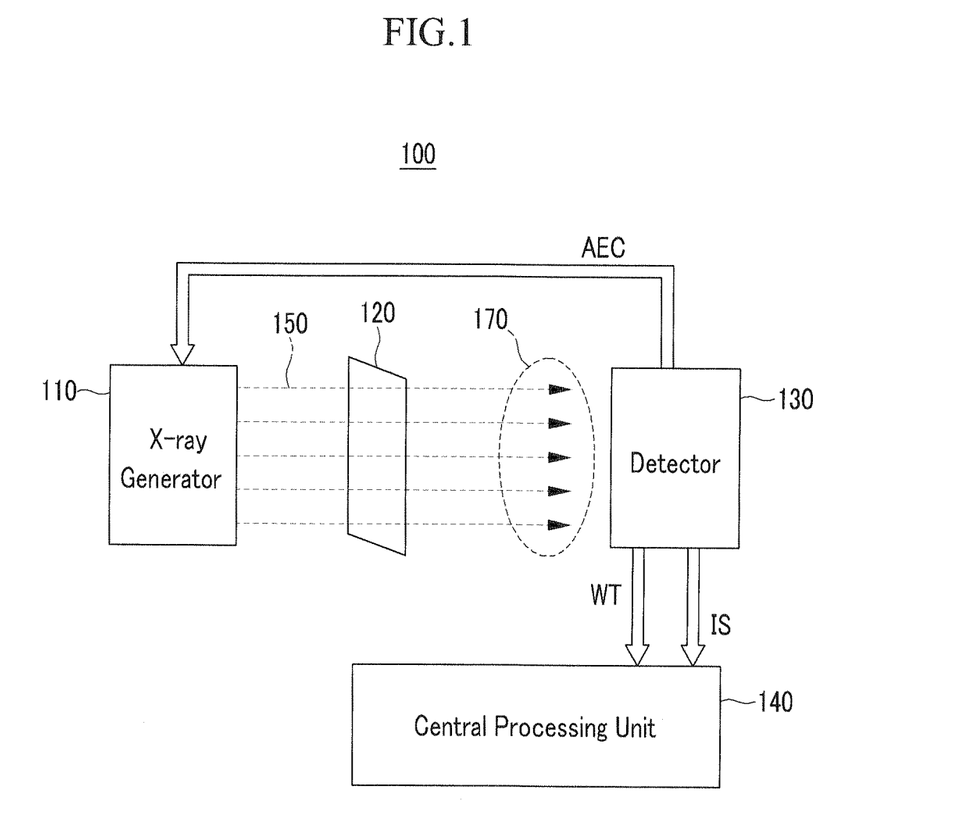
FIG. 1 is a schematic view of an X-ray detecting apparatus constructed as an exemplary embodiment of the present invention.

FIG. 1 is a schematic view showing an X-ray detecting apparatus constructed as an exemplary embodiment of the present invention.

An X-ray detecting apparatus 100 constructed as an exemplary embodiment of the present invention includes an X-ray generator 110, a detector 130, and a central processing unit 140. The X-ray detecting apparatus 100 does not have a fixed X-ray window time, and sets the X-ray window time as an actual time period during which the X-ray is properly irradiated. Also, the X-ray detecting apparatus 100 does not set the offset image, but determines the offset image to be appropriate for the window time determined every frame.

The X-ray generator 110 emits an X-ray 150 toward a subject 120. The X-ray before passing through the subject 120 is indicated by reference numeral 150, and the X-ray after passing through the subject 120 is indicated by reference numeral 170.

The detector 130 receives the X-ray 170 which has passed through the subject 120, and coverts the X-ray 170 into an electric signal and outputs the electric signal. The electric signal may be output as the video signal IS, the electric signal is converted by the detector 130 from the transmittance result of the X-ray 170 for the subject 120, and the video signal IS is transmitted from the detector 130 to the central processing unit 140. The detector 130 controls an X-ray emitting time of the X-ray generator 110.

The central processing unit 140 receives the video signal IS and the window time WT output from the detector 130, and determines an offset video signal OFFS representing the offset image in accordance with the window time WT transmitted from the detector 130. The central processing unit 140 removes the offset signal OFFS from the video signal IS in order to generate an X-ray photographing image of the subject 120.

The offset video signal OFFS in accordance with an exemplary embodiment of the present invention is an electric signal generated in accordance with X-ray detected by the detector 130 in the state where the detector 130 is not exposed to the X-ray 170. In the present invention, the window time is not fixed, and the window time is determined as the actual time period when the detector 130 is exposed to the X-ray 170 such that the detector 130 is not exposed outside except for the window time. That is, the offset video signal OFFS may be determined in accordance with the window time.

The central processing unit 140 constructed as an exemplary embodiment of the present invention determines the offset video signal OFFS by using the relationship between the window time WT and a squared value of the video signal IS transmitted from the detector 130 as a function of the window time WT. In detail, the central processing unit 140 includes a lookup table showing the relationship between the window time WT and the squared value of the video signal IS, and detects the real X-ray exposure time transmitted from the X-ray generator 110, that is, the offset video signal corresponding to the window time.

Next, the X-ray detecting apparatus 100 constructed as an exemplary embodiment of the present invention will be described with reference to FIGS. 2 through 5.

Figure 2:
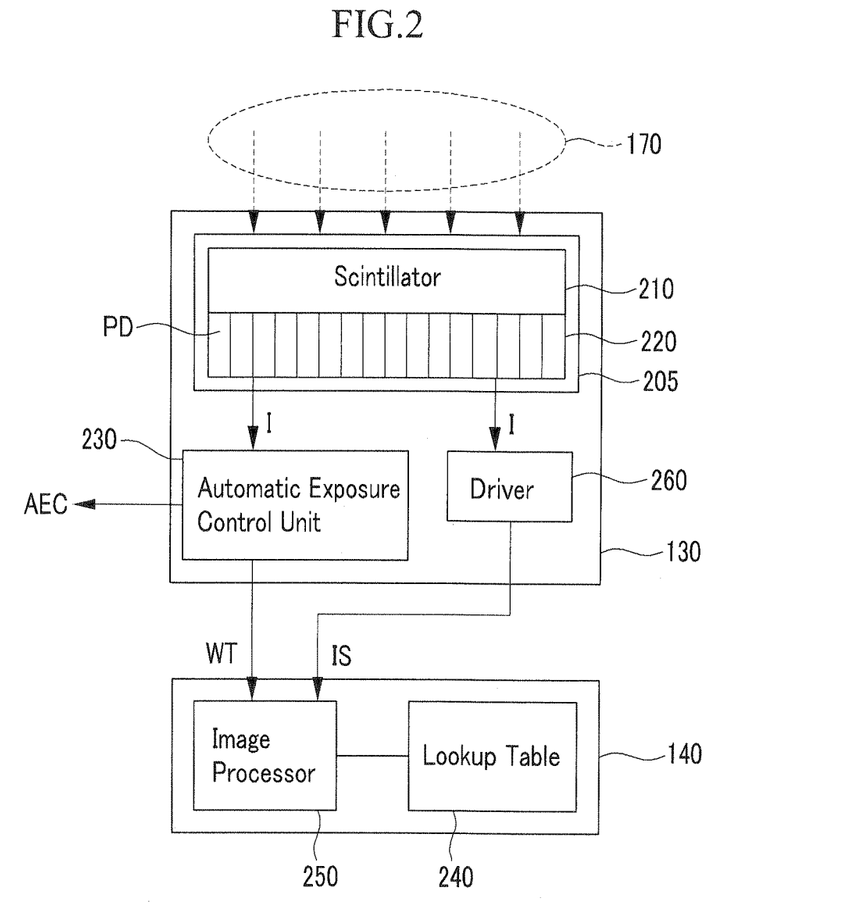
FIG. 2 is a schematic view of a detector and a central processing unit as shown in FIG. 1.

FIG. 2 is a schematic view of a detector 130 and a central processing unit 140 of FIG. 1.

Referring to FIG. 2, the detector 130 includes an X-ray panel 205 and an automatic exposure control (AEC) unit 230.

The X-ray panel 205 includes a scintillator 210 and a plurality of PIN diodes PD. Reference numeral 220 indicates a region where the plurality of PIN diodes are formed, and is referred to as a PIN diode layer 220.

In FIG. 2, a cross-sectional structure of the X-ray panel 205 is shown for better understanding and ease of description.

The scintillator 210 receives the X-ray 170 passing through the object 120 according to the density of the subject 120, and converts the X-ray 170 into the visible ray.

The PIN diode PD generates an electrical current I in proportion to the light amount of the visible ray input from the scintillator 210 into a region where the corresponding PIN diode PD is positioned.

The generated electrical current I is transmitted to the driver 260 and to the automatic exposure control (AEC) unit 230 of the detector 130.

The driver 260 converts the transmitted current I into the digital signal in order to generate and output the video signal IS.

The automatic exposure control unit 230 outputs an automatic exposure control signal AEC, and transmits the signal AEC back to the X-ray generator 110 in order to stop the X-ray generator 110 from further inputting the X-ray to the object 120. Therefore, the X-ray of an initial predetermined amount (hereinafter referred to as an initial predetermined amount) is input to the X-ray panel 205. The automatic exposure control unit 230 receives the electrical current I generated by the PIN diode layer 220 and determines whether the X-ray input to the X-ray panel 205 reaches the initial predetermined amount. The automatic exposure control unit 230 then generates the actual time period (i.e., the window time WT) during which the detector 130 is exposed to the X-ray 170. The automatic exposure control unit 230 transmits the window time WT to the central processing unit 140.

The X-ray generator 110 stops the emission of the X-ray upon receiving the auto exposure control signal AEC. Here, the initial predetermined amount means the emission amount of the X-ray to obtain an X-ray photograph image of a specification required according to a kind or a product model of the subject 120. The initial predetermined amount may be changed in accordance with the product model of the X-ray detecting apparatus or the kind of the subject to be photographed. For a particular product model of the X-ray detecting apparatus, the experimental relationship between the window time WT and the offset video signal OFFS is generally fixed, therefore, one may possible determine the offset video signal OFFS by looking up a mapping between the window time WT and the offset video signal OFFS in order to reduce the processing time for generating the offset video signal OFFS.

Referring to FIG. 2, the central processing unit 140 includes a lookup table 240 and an image processor 250.

The lookup table 240 stores the information related to the graph that the squared value of the corresponding video signal compared with the exposure time of the X-ray. That is, the lookup table 240 stores a relationship between the squared values of the corresponding video signal and the exposure time of each X-ray, that is, the window time.

Figure 3:
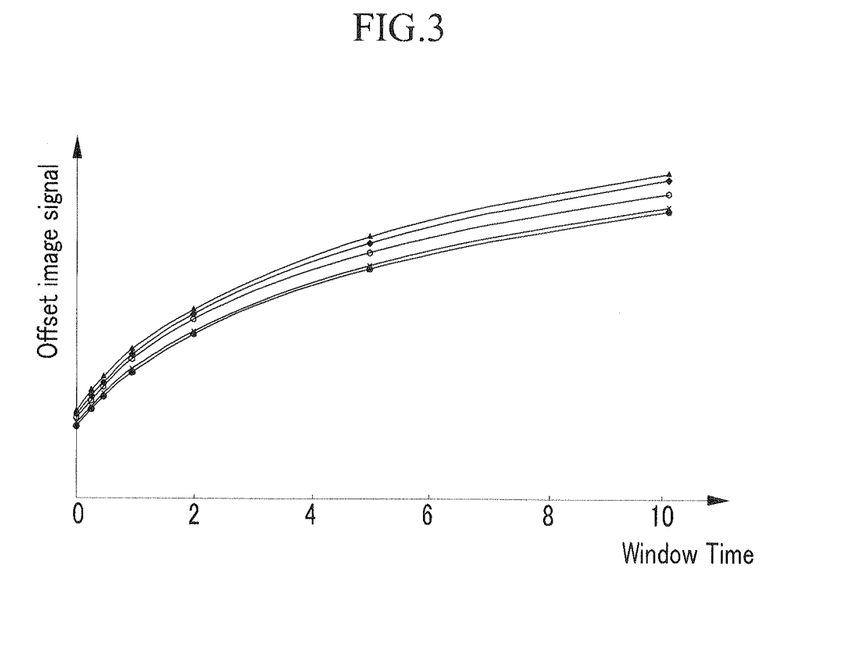
FIG. 3 is a two dimensional graph showing a video signal value as a function of a window time.

FIG. 3 is a graph showing a video signal value for a window time.

In FIG. 3, the X axis is a window time value, and the Y axis is an offset video signal value. The window time WT means a period from the time point that the X-ray generator 110 starts the emission of the X-ray to the time point that the emission of the X-ray is stopped by the automatic exposure control signal AEC. The video signal value of the Y axis is the value of the X-ray detected by the scintillator 210 and the PIN diode 220 that is converted into the digital signal.

FIG. 3 is a graph showing the offset video signal for the window time in five different product models of X-ray detecting apparatuses. Referring to FIG. 3, the relationships between the offset video signal values and the window time slightly alter in accordance with the product model of the X-ray detecting apparatus, however, as shown, the X-ray detecting apparatuses for each product model have similar shapes of the curves showing the offset video signal values as functions of the window time.

As shown in FIG. 3, the charge amount detected by the scintillator 210 and the PIN diode 220 is increased when the window time is increased, therefore, the offset video signal is increased when the window time is increased.

Figure 4:
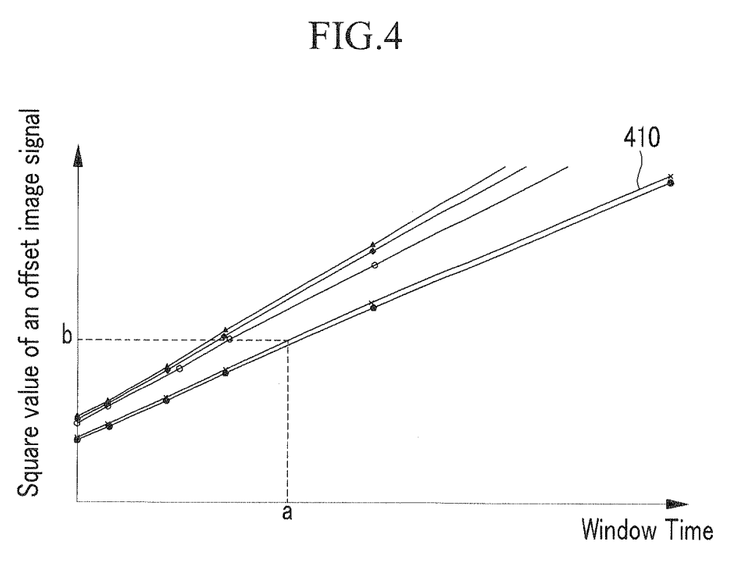
FIG. 4 is a two dimensional graph showing a squared value of a video signal as a function of a window time.

FIG. 4 is a graph showing a squared value of a video signal for a window time. In FIG. 4, the X axis is the same as the X axis of FIG. 3, and the Y axis is the squared value of the Y axis of FIG. 3, that is, the squared value of the offset video signal.

The present invention uses the point that the squared value of the offset video signal according to the window time and the window time is linear as shown in FIG. 4.

As shown in FIG. 4, the squared value of the offset video signal for the window time slightly varies in accordance with the product model of the X-ray detecting apparatus, however, the squared values of the offset video signals for the window time all have the straight line shape regardless the product model of the X-ray detecting apparatus.

The graph showing the squared value of the offset video signal for the window time has the straight shape such that the squared values of the offset video signal corresponding to two different window times may be obtained as the graph shown in FIG. 4. Accordingly, it is unnecessary to experimentally obtain the offset video signal value for all positions for the window time. That is, the video signal value corresponding to the arbitrary window time may be easily and speedily obtained by using the graph showing the squared value of the offset video signal for the window time.

For example, for the corresponding X-ray detecting apparatus 100, when the graph shown in FIG. 4 showing the squared value of the video signal for the window time is a line 410, in the case that the window time WT transmitted from the automatic exposure control unit 230 is "a," the central processing unit 140 may obtain the squared value "b" of the offset video signal through the line 410. The offset video signal value is the square root value of the squared value of the offset video signal such that the offset video signal value may be obtained if the squared value of the offset video signal is recognized.

The lookup table 240 stores the information related to the graph as shown in FIG. 4. That is, the window time and the squared value of the offset video signal as a function of the window time are stored in the lookup table 240. The interval of the stored window time may be changed in accordance with the memory capacity of the lookup table 240 or the product specifications of the X-ray detecting apparatus. For example, when the memory capacity of the lookup table 240 is high, the interval of the window time is narrowly determined compared with the lookup table having a low memory capacity.

Also, a calculation memory unit (not shown) may be provided instead of the lookup table 240. The calculation memory unit stores a calculation equation ($y=cx+d$) representing a curve of the graph of FIG. 4, and the squared value of the video signal may be obtained by inputting the arbitrary value x.

The image processor 250 removes the component of the offset video signal obtained by using the lookup table 240 from the video signal transmitted from the driver 260 during the window time, thereby outputting the video signal representing the X-ray result of photographing the subject 120. Next, the video signal representing the X-ray result of photographing the subject 120 is referred to as a real video signal.

Figure 5A:
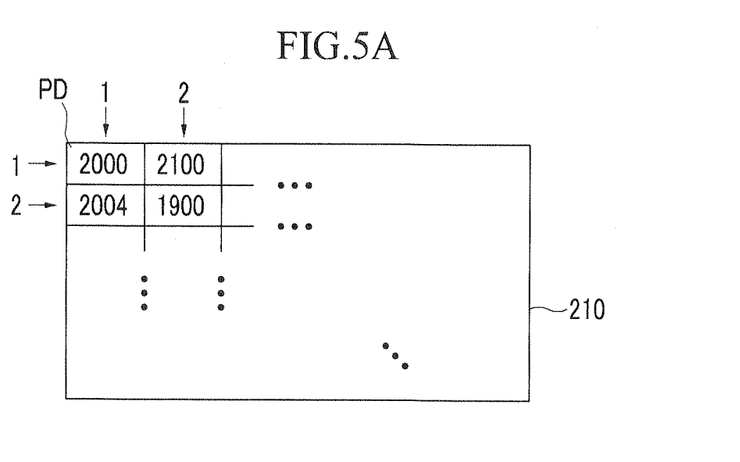
FIG. 5A through 5C are views explaining an operation of the image processor 250 shown in FIG. 2.
Figure 5B:
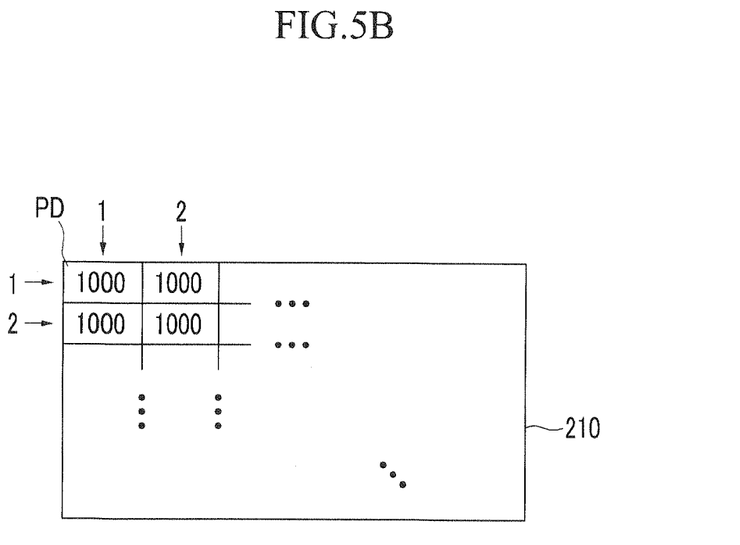
Figure 5C:
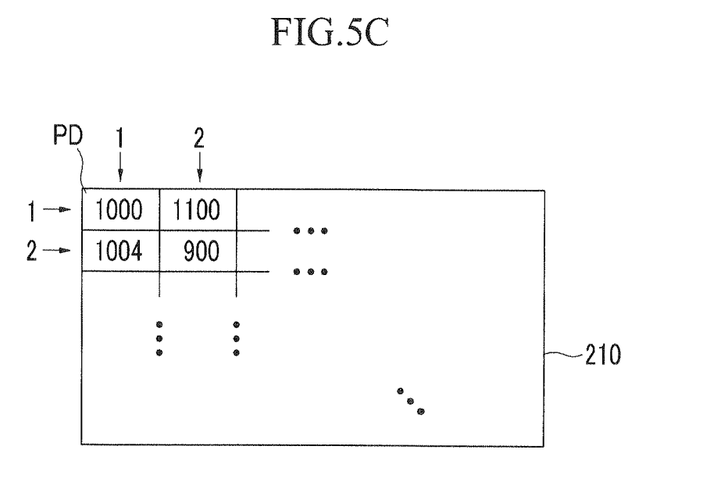

FIGS. 5A through 5C are schematic views explaining an operation of the image processor 250 shown in FIG. 2. A plurality of PIN diodes of the X-ray detecting panel 210 constructed as an exemplary embodiment of the present invention are arranged in a matrix format as shown in FIGS. 5A through 5C.

FIG. 5A is a schematic view showing video signals IS according to the charge amount respectively input to the plurality of PIN diodes PD during the window period corresponding to regions of the corresponding PIN diodes PD.

As shown in FIG. 5A, the video signal IS input to the PIN diode PD of the region (1, 1) is 2000, the video signal IS input to the PIN diode PD of the region (1, 2) is 2100, the video signal IS input to the PIN diode PD of the region (2, 1) is 2004, and the video signal IS input to the PIN diode PD of the region (2, 2) is 1900.

FIG. 5B is a schematic view showing the offset video signals corresponding to the window time respectively input to the plurality of PIN diodes PD. All window times of PIN diodes (PD) of regions (1, 1), (1, 2), (1, 3), and (1, 4) are same, therefore offset video signals regions (1, 1), (1, 2), (1, 3), and (1, 4) are 1000.

FIG. 5C is a schematic view showing real video signals for the X-ray result of photographing the subject respectively input to the plurality of PIN diodes PD.

The central processing unit 140 subtracts the offset video signal shown in FIG. 5B from the video signal shown in FIG. 5A to generate the real video signal.

For example, referring to the step of the real photographing image processing of the region (1, 1) of the image of one frame, that is, row 1 and column 1, the offset video signal "1000" is subtracted from the video signal IS "2000" that is detected in the detector 130 and is output to the image processor 250 such that the real video signal "1000" corresponding to the region (1, 1) is calculated.

As described above, unlike the contemporary X-ray detecting apparatus, the fixed window time when considering the margin whenever the photographing is executed is not used in the present invention. Conversely, in the present invention, the real X-ray exposure time is determined as the window time such that the time of the X-ray photographing may be reduced. The offset image may be determined by looking up the lookup table 240, thus, the additional time for generating the offset image is not required. Therefore, the X-ray photographing may be remarkably reduced.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

DESCRIPTION OF SYMBOLS

X-ray detecting apparatus 100, X-ray generator 100, detector 130,
central processing unit 140, subject 120, X-ray 170,
video signal IS, scintillator 210, PIN diode layer 220,
X-ray panel 205, lookup table 240, image processor 250,
automatic exposure control (AEC) unit 230, PIN diode PD

What is claimed is:

1. An X-ray detecting apparatus for photographing a subject by using an X-ray, comprising:
a detector receiving the X-ray passing through the subject during a window time in which the subject is exposed to the X-ray, and converting the X-ray into an electrical signal in order to output a video signal; and
a central processing unit subtracting an offset video signal determined in accordance with the window time from the video signal in order to generate a real video signal representing an X-ray result of photographing the subject, the central processing unit determining the offset video signal by using a relationship between the window time and a squared value of the offset video signal corresponding to the window time.

2. The X-ray detecting apparatus of claim 1, wherein the relationship between the window time and a squared value of the offset video signal corresponding to the window time is linear.

3. The X-ray detecting apparatus of claim 1, wherein the central processing unit comprises:
a lookup table storing a relationship between the window time and a squared value of the offset video signal corresponding to the window time; and
an image processor generating the real video signal by subtracting the offset video signal from the video signal.

4. The X-ray detecting apparatus of claim 1, wherein the detector comprises:
an X-ray panel converting the X-ray passing through the subject into a visible ray, and generating an electrical current in accordance with an amount of the visible ray converted; and
an automatic exposure control (AEC) unit receiving the electrical current, determining whether the X-ray of an initial predetermined amount is input to the X-ray panel by using the electrical current, and outputting an auto exposure control signal in order to stop an exposure of the X-ray for the subject when the X-ray of the initial predetermined amount has been input.

5. The X-ray detecting apparatus of claim 4, wherein the X-ray panel comprises:
a scintillator converting the X-ray passing through the subject into the visible ray; and
a PIN diode receiving the converted visible ray and generating an electric charge in proportion to the amount of the visible ray.

6. The X-ray detecting apparatus of claim 4, further comprising
an X-ray generator generating the X-ray and stopping the generation of the X-ray in response to the auto exposure control signal.

7. A method for detecting an X-ray photographing a subject by using the X-ray, comprising:
inputting the X-ray passing through the subject during a window time in which the subject is exposed to the X-ray;
converting the input X-ray into an electrical signal and outputting the electrical signal as a video signal;
determining an offset video signal contained in the video signal in accordance with the window time, the determination of the offset video signal using a relationship between the window time and a squared value of the offset video signal corresponding to the window time; and
subtracting the offset video signal from the video signal in order to generate a real video signal representing an X-ray result for photographing the subject.

8. The method of claim 7, wherein the relationship between the window time and the squared value of the offset video signal corresponding to the window time is linear.

9. The method of claim 7, wherein,
in the conversion of the X-ray into the electrical signal and the output of the electrical signal as the video signal,
the X-ray passing through the subject is converted into a visible ray, and an electrical current is generated in accordance with an amount of the visible ray converted.

10. The method of claim 9, further comprising:
receiving the electrical current generated, and determining whether the X-ray of an initial predetermined amount is input to the X-ray panel by using the electrical current received; and
stopping the exposure of the X-ray for the subject when the X-ray of the initial predetermined amount has been input.

* * * * *